United States Patent [19]

Hodgson

[11] 4,069,299

[45] Jan. 17, 1978

[54] HYDROXY-ALUMINUM CHLORIDE AND SULFATE POLYMER PRODUCTION

[75] Inventor: Clive Hodgson, Forest Knolls, Calif.

[73] Assignee: Chevron Research Company, San Francisco, Calif.

[21] Appl. No.: 747,566

[22] Filed: Dec. 6, 1976

Related U.S. Application Data

[63] Continuation-in-part of Ser. No. 683,551, May 5, 1976, abandoned.

[51] Int. Cl.$^2$ .......................... C01F 7/00; C01F 7/74; C01F 7/56

[52] U.S. Cl. .................................. 423/462; 423/556; 423/470; 423/545; 423/437

[58] Field of Search ................ 423/462, 556, 470, 545

[56] References Cited

U.S. PATENT DOCUMENTS

| | | | |
|---|---|---|---|
| 2,250,926 | 7/1941 | Clark | 423/556 X |
| 3,544,476 | 12/1970 | Aiba et al. | 423/556 X |
| 3,925,428 | 12/1975 | Hodsson | 423/394 |
| 3,929,666 | 12/1975 | Aiba et al. | 423/556 X |
| 3,957,947 | 5/1976 | Yamada et al. | 423/462 X |

OTHER PUBLICATIONS

McPherson & Henderson book "A Course in General Chem.", 3rd Ed., 1927, p. 565, Ginn & Co., N.Y.

*Primary Examiner*—Edward Stern
*Attorney, Agent, or Firm*—Dix A. Newell; T. G. DeJonghe; Raymond Owyang

[57] ABSTRACT

Hydroxy-aluminum chloride or sulfate polymer is produced by reacting urea and aluminum chloride or aluminum sulfate in aqueous solution. The hydroxy-aluminum chloride and sulfate polymers are useful for consolidating soil in secondary oil recovery and for reducing the caking tendency of ammonium salt fertilizer compositions.

17 Claims, No Drawings

HYDROXY-ALUMINUM CHLORIDE AND SULFATE POLYMER PRODUCTION

RELATED APPLICATIONS

This application is a continuation-in-part of application Ser. No. 683,551, filed May 5, 1976, now abandoned, the disclosure of which is incorporated herein by reference.

This application is related to U.S. application Ser. No. 458,631, filed Apr. 8, 1974, now U.S. Pat. No. 3,925,428, which discloses the preparation of hydroxy-aluminum nitrate by reacting aluminum nitrate and urea and to U.S. application Ser. No. 458,632, filed Apr. 8, 1974, now U.S. Pat. No. 3,927,184, which discloses the preparation of hydroxy-aluminum nitrate by reacting aluminum nitrate and aluminum powder.

BACKGROUND OF THE INVENTION

Hydroxy-aluminum polymers can be prepared by the controlled addition of an alkali metal or ammonium base, e.g., sodium hydroxide or ammonium hydroxide, to an aqueous solution of a water-soluble aluminum salt. It is believed that when the base is added to an aluminum salt solution, $OH^-$ ions link the $Al^{3+}$ ions together forming stable rings composed of six aluminum atoms per unit. When the molar ratio of OH/Al is in the range of 0 to 2.1, the reaction involves the formation of single units of compositions — $[Al_6(OH)_2]^{6+}$ — or double units — $[Al_{10}(OH)_{22}]^{8+}$. With ratios from 2.25 to 2.7, the additional $OH^-$ reacts with these single units and forms a continuous series of higher polymers.

The nature of hydroxy-aluminum polymers and their preparation are discussed by P. H. Hsu and T. F. Bates, in *Soil Science Society of America Proceedings*, 28, No. 6, 763–769 (1964), and in "Formation of X-ray Amorphous and Crystalline Aluminum Hydroxides", *Mineralogical Magazine*, 33, 749–768 (1964).

Hydroxy-aluminum polymers are used for soil consolidation in secondary oil recovery, as disclosed, for example, in U.S. Pat. No. 3,603,399, issued Sept. 7, 1971, to M. G. Reed.

Hydroxy-aluminum polymers are also used as additives in ammonium salt compositions to reduce caking tendency and to improve hardness, as disclosed in U.S. Ser. No. 323,571, of G. R. Hawkes et al, filed Jan. 15, 1973, now U.S. Pat. No. 3,852,055.

SUMMARY OF THE INVENTION

It has now been found that hydroxy-aluminum chloride or sulfate polymer is produced by reacting urea and aluminum chloride or aluminum sulfate in aqueous solution. Although it is not desired to be bound by any particular theory, the approximate stoichiometry of the reaction between urea and aluminum chloride appears to be (1):

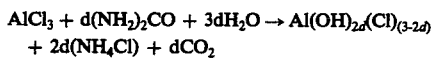

wherein $d$ can vary from 0 to 1.4, and the approximate stoichiometry of the reaction between urea and aluminum sulfate appears to be (2):

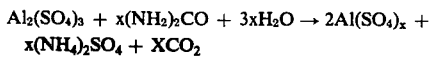

wherein $x$ can vary from 0 to 2.8. It is appreciated, of course, that when $d$ or $x$ is O, no urea reactant is present. Therefore, $d$ preferably varies from about 0.1 to 1.3, more preferably from about 0.5 to 1.25, and most preferably from about 1 to 1.2, and $x$ preferably varies from about 0.1 to 2.6, more preferably from about 1 to 2.5, and most preferably from about 2 to 2.4.

DESCRIPTION OF PREFERRED EMBODIMENTS

In general, any commercially available grade of urea, e.g., fertilizer grade urea, is suitably employed in the process of the invention. The aluminum chloride reactant is suitably anhydrous aluminum chloride or hydrated aluminum chloride, and the aluminum sulfate reactant is suitably anhydrous aluminum sulfate or hydrated aluminum sulfate.

The molar ratio of aluminum chloride to urea suitably varies from about 1:0.1 to 1:1.3, preferably from about 1:0.5 to 1:1.25, more preferably from about 1:1 to 1:1.2. The molar ratio of aluminum sulfate to urea suitably varies from about 1:0.1 to 1:2.6, preferably from about 1 to 1:2.5, more preferably from about 1:2 to 1:2.4.

The process of the invention is conducted in aqueous solution. Generally, from about 1 mol to 1000 mols of water per mol urea is employed, although from about 10 to 100 mols of water per mol urea is preferred.

A variety of procedures can be employed for contacting the reactants. In one modification, the entire amounts of reactants are charged to a reactor and maintained at reaction conditions for the desired reaction period. In another modification, one reactant is added to the other reaction components in increments, as by adding urea to an aqueous solution of aluminum chloride or aluminum sulfate. By any modification, the process is most efficiently conducted at elevated temperatures. In general, temperatures varying from about 50° to 150° C are satisfactory, with temperatures from about 75° to 125° C being preferred. The most preferred reaction temperature is the boiling point of the aqueous reaction mixture, i.e., reflux temperature. Atmospheric, subatmospheric or superatmospheric pressures are suitably employed, although it is generally most convenient to employ atmospheric reaction pressure. Reaction times, of course, depend in part upon the molar ratio of reactants and in part upon the reaction temperature and pressure. Generally, however, reaction times varying from 1 hour to 24 hours are satisfactory.

The hydroxy-aluminum chloride product is water-soluble and the aqueous product mixture of the hydroxy-aluminum chloride polymer is suitable for most applications, such as in fertilizers or in soil consolidations, without further purification. However, if desired, the product mixture of hydroxy-aluminum chloride can be evaporated to give more concentrated solutions or solid products. The hydroxy-aluminum sulfate polymer is highly insoluble in water and is precipitated from the reaction mixture as a white gel. The gel is isolated by conventional procedures, such as filtration, to give the hydroxy-aluminum sulfate polymer as a white powder.

The aluminum to hydroxyl molar ratio of the hydroxy-aluminum polymer depends largely upon the molar ratio of aluminum chloride to urea or the molar ratio of aluminum sulfate to urea employed in the process. Generally, the preferred molar ratio of aluminum to hydroxyl is from about 1:1 to 1:2.5, and more preferably, from 1:2 to 1:2.4.

The preparation of hydroxy-aluminum chloride and sulfate polymers by the process of the invention is illustrated by the following examples.

EXAMPLE 1

Aluminum chloride hexahydrate (48.3 g, 0.2 mol) water (75 g, 4.2 mol) and urea (5 g, 0.08 mol) were refluxed together for 16 hours. The clear solution which resulted was analyzed for aluminum and hydroxyl content and found to have an aluminum to hydroxyl ratio of 1:0.83. The hydroxyl content was determined by direct titration after the addition of potassium oxalate to prevent hydrolysis of the aluminum ion. The final solution contained hydroxy-aluminum chloride polymer having the empirical formula $Al(OH)_{0.83}(Cl)_{2.17}$.

EXAMPLE 2

Aluminum chloride hexahydrate (48.3 g, 0.2 mol) water (75 g, 4.2 mol) and urea (7.5 g, 0.125 mol) were refluxed together for 16 hours. The clear solution which resulted was analyzed for aluminum and hydroxyl content and found to have an aluminum to hydroxyl ratio of 1:1.19. The final solution contained hydroxy-aluminum chloride polymer having the empirical formula $Al(OH)_{1.19}(Cl)_{1.81}$.

EXAMPLE 3

Aluminum chloride hexahydrate (48.3 g, 0.2 mol) water (75 g, 4.2 mol) and urea (10.0 g, 0.16 mol) were heated under reflux for about 16 hours. The clear solution which resulted was analyzed for aluminum and hydroxyl content and found to have an aluminum to hydroxyl ratio of 1:1.6. The final solution contained hydroxy-aluminum chloride polymer having the empirical formula $Al(OH)_{1.6}(Cl)_{1.4}$.

EXAMPLE 4

Aluminum chloride hexahydrate (48.3 g, 0.2 mol) water (75 g, 4.2 mol) and urea (12.5 g, 0.2 mol) were heated together for 16 hours. The clear solution which resulted was analyzed for aluminum and hydroxyl content and found to have an aluminum to hydroxyl ratio of 1:2.04. The final solution contained hydroxy-aluminum chloride polymer having the empirical formula $Al(OH)_{2.04}(Cl)_{0.96}$.

EXAMPLE 5

Aluminum chloride hexahydrate (48.3 g, 0.2 mol), water (75 g, 4.2 mol) and urea (15 g, 0.24 mol) were heated under reflux for about 16 hours. The resulting clear solution was analyzed for aluminum and hydroxyl content, revealing the aluminum to hydroxyl ratio to be 1:2.32. The final solution contained hydroxy-aluminum chloride polymer having the empirical formula $Al(OH)_{2.32}(Cl)_{0.68}$.

EXAMPLE 6

$Al_2(SO_4)_3 \cdot 18H_2O$ (26.6 g), urea (6.0 g) and water (200 g) were heated under reflux overnight. Next morning, the white precipitate was filtered, washed with water and dried at 110° C. The resulting white powder was found to have 20.3% aluminum, 38.8% sulfate, 2.17% ammoniacal nitrogen, and an OH/Al mol ratio of 2.13:1. The empirical formula is $Al(OH)_{2.13}(SO_4)_{0.42}$.

EXAMPLE 7

$Al_2(SO_4)_3 \cdot 18H_2O$ (66.7 g), urea (12.0 g) and water (75 g) were heated under reflux overnight. Next morning, the resulting slurry was filtered, washed with water and dried in a 90° C oven. The dried powder was found to contain 15.9% aluminum, 45.0% sulfate, 3.02% ammoniacal nitrogen and an OH/Al ratio of 1.77:1. The empirical formula is $Al(OH)_{1.77}(SO_4)_{0.62}$.

EXAMPLE 8

Example 7 was repeated except that 9.0 g of urea was used. The resulting powder contained 10.6% aluminum, 42.4% sulfate, 2.84% ammoniacal nitrogen and an OH/Al ratio of 1.26:1. The empirical formula is $Al(OH)_{1.26}(SO_4)_{0.87}$.

EXAMPLE 9

Example 8 was repeated except that 6.0 g of urea was used. The resulting powder contained 9.3% aluminum, 43.6% sulfate, 2.92% ammoniacal nitrogen and an OH/Al ratio of 0.98:1.

What is claimed is:

1. A process of preparing hydroxy-aluminum chloride or sulfate which comprises reacting urea and aluminum chloride or aluminum sulfate, wherein the molar ratio of aluminum chloride to urea varies from about 1:0.1 to 1:1.3 and the molar ratio of aluminum sulfate to urea varies from about 1:0.1 to 1:2.6, at a temperature of about 50° to 150° C, in aqueous solution medium of about 1 mol to 1000 mols water per mol of urea.

2. The process of claim 1 for preparing hydroxy-aluminum chloride polymer wherein the molar ratio of aluminum chloride to urea varies from about 1:0.5 to 1:1.25 and the molar ratio of aluminum to hydroxyl in the hydroxy-aluminum polymer varies from about 1:1 to 1:2.5.

3. The process of claim 1 for preparing hydroxy-aluminum chloride polymer wherein the molar ratio of aluminum chloride to urea varies from about 1:1 to 1:1.2 and the molar ratio of aluminum to hydroxyl in the hydroxy-aluminum polymer varies from about 1:2 to 1:2.4.

4. The process of claim 1 for preparing hydroxy-aluminum chloride polymer wherein the aluminum chloride is aluminum chloride hexahydrate.

5. The process of claim 1 for preparing hydroxy-aluminum chloride polymer wherein the temperature varies from 75° to 125° C.

6. The process of claim 1 for preparing hydroxy-aluminum chloride polymer wherein 10 mols to 100 mols water per mol urea is employed.

7. The process of claim 1 for preparing hydroxy-aluminum chloride polymer by reacting aluminum chloride, urea and water according to the following net reaction:

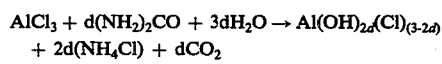
$$AlCl_3 + d(NH_2)_2CO + 3dH_2O \rightarrow Al(OH)_{2d}(Cl)_{(3-2d)} + 2d(NH_4Cl) + dCO_2$$

wherein d varies from 0.1 to 1.4.

8. The process of claim 7 wherein d varies from 0.5 to 1.25.

9. The process of claim 8 wherein d varies from 1 to 1.2, the reaction temperature varies from about 75° to 125° C, and 10 mols to 100 mols water per mol aluminum chloride is employed.

10. A process of preparing hydroxy-aluminum sulfate polymer which comprises reacting urea and aluminum sulfate wherein the molar ratio of aluminum sulfate to urea varies from about 1:1 to 1:2.5 and the molar ratio of aluminum to hydroxyl in the hydroxy-aluminum polymers varies from about 1:1 to 1:2.5, at a temperature of about 50° to 150° C, in aqueous solution medium of about 1 mol to 1000 mols water per mol of urea.

11. The process of claim 10 for preparing hydroxy-aluminum sulfate polymer wherein the molar ratio of aluminum sulfate to urea varies from about 1:2 to 1:2.4 and the molar ratio of aluminum to hydroxyl in the hydroxy-aluminum polymer varies from about 1:2 to 1:2.4.

12. The process of claim 10 for preparing hydroxy-aluminum sulfate polymer wherein the aluminum sulfate is $Al_2(SO_4)_3 \cdot 18H_2O$.

13. The process of claim 10 for preparing hydroxy-aluminum sulfate polymer wherein the temperature varies from 75° to 125° C.

14. The process of claim 10 for preparing hydroxy-aluminum sulfate polymer wherein 10 mols to 100 mols water per mol urea is employed.

15. The process of claim 10 for preparing hydroxy-aluminum sulfate polymer by reacting aluminum sulfate, urea and water according to the following net reaction:

$$Al_2(SO_4)_3 + x(NH_2)_2CO + 3xH_2O \rightarrow 2Al(OH)_x(SO_4)_{(3-x)/2} + x(NH_4)_2SO_4 + xCO_2$$

wherein $x$ varies from 0.1 to 2.8.

16. The process of claim 15 wherein $x$ varies from 1 to 2.5.

17. The process of claim 16 wherein $x$ varies from 2 to 2.4, the reaction temperature varies from about 75° to 125° C, and 10 mols to 100 mols water per mol urea is employed.

* * * * *